UNITED STATES PATENT OFFICE.

JOHN ALFRED LILLIE, OF LIVERPOOL, ENGLAND, ASSIGNOR TO J. B. WILKIE, OF LIVERPOOL, ENGLAND.

METHOD OF PREVENTING FOULING AND COMPOSITION THEREFOR.

1,392,068.     Specification of Letters Patent.     Patented Sept. 27, 1921.

No Drawing.     Application filed October 4, 1920. Serial No. 414,643.

*To all whom it may concern:*

Be it known that I, JOHN ALFRED LILLIE, subject of the King of Great Britain, residing at Liverpool, in the county of Lancaster and Kingdom of England, have invented certain new and useful Improvements in Methods of Preventing Fouling and Composition Therefor (for which I have filed an application in Great Britain April 14, 1919,) of which the following is a specification.

This invention has for its object a method of preventing fouling on surfaces exposed to water and a solution which will act as an antifouling composition for ships, and as a poison for other purposes, and which to a great extent is a preservative. I have tested it on a ship and found it was a remarkable antifouling composition, and kept the ship very largely free from marine growth.

According to my invention I express the juice (especially of the berries) of a tree or shrub belonging to the genus *Alchornea*, namely *Alchornea cordifolia* Muell. Arg. (*A. Cordata*, Bth) a shrub or small tree found on the west coast of Africa, and called by the natives Upa, Iza or Ipa, and coat the said surfaces therewith. The juice is used either alone or in combination with other antifouling compositions or poisons, and it can either be merely the expressed juice or the pounded-up berries dried and mixed up as a paint with other menstruum or mixed with materials as a poison for rats, &c.

Any composition containing the juice of the berry falls within my invention, *e. g.* the expressed juice or a decoction or the berry pounded up whole. In all cases I may incorporate other substances, such as ordinary "size" for example, as vehicles or to render the composition less liable to be dissolved away by the action of the water.

I claim—

1. An anti-fouling composition comprising the combination, with the active principle of the Iza, Upa or Ipa berry (*Alchornea cordifolia*, Muell.-Arg.), of an admixed substance constituting a vehicle therefor, substantially as described.

2. A method of preventing fouling on metal surfaces which comprises treating said surfaces with the juice of the Iza, Upa or Ipa berry (*Alchornea cordifolia*, Muell.-Arg.).

3. A method of preventing fouling on metal surfaces which comprises treating said surfaces with a composition containing the active principle of the Iza, Upa or Ipa berry (*Alchornea cordifolia*, Muell.-Arg.).

In witness whereof I have hereunto signed my name this 15th day of September, 1920, in the presence of two subscribing witnesses.

JOHN ALFRED LILLIE.

Witnesses:
J. C. McKAE,
H. J. GREGORY.